Inventor,
Percy H. Batten
Davis, Lindsey, Smith & Shorts
Attys.

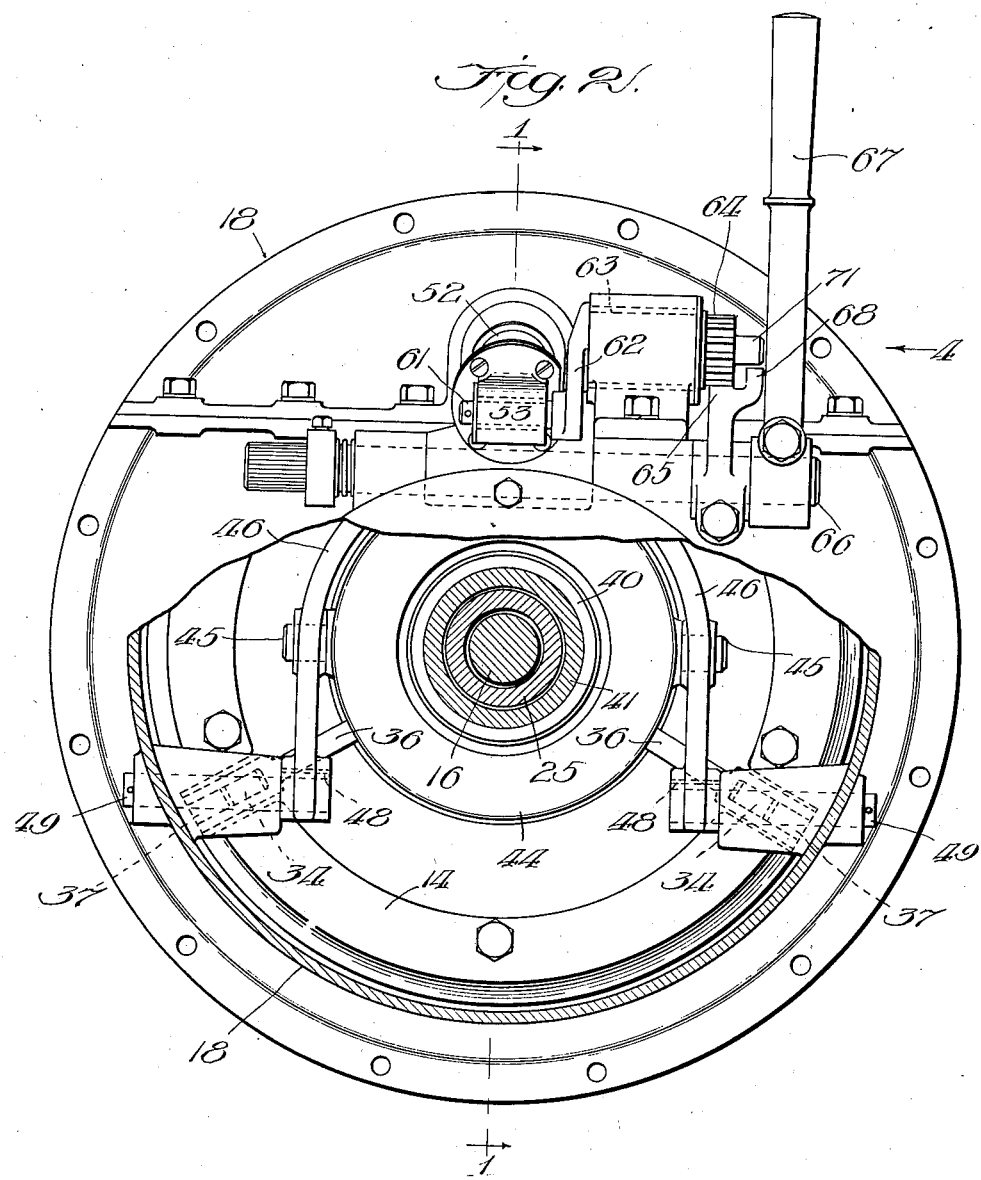

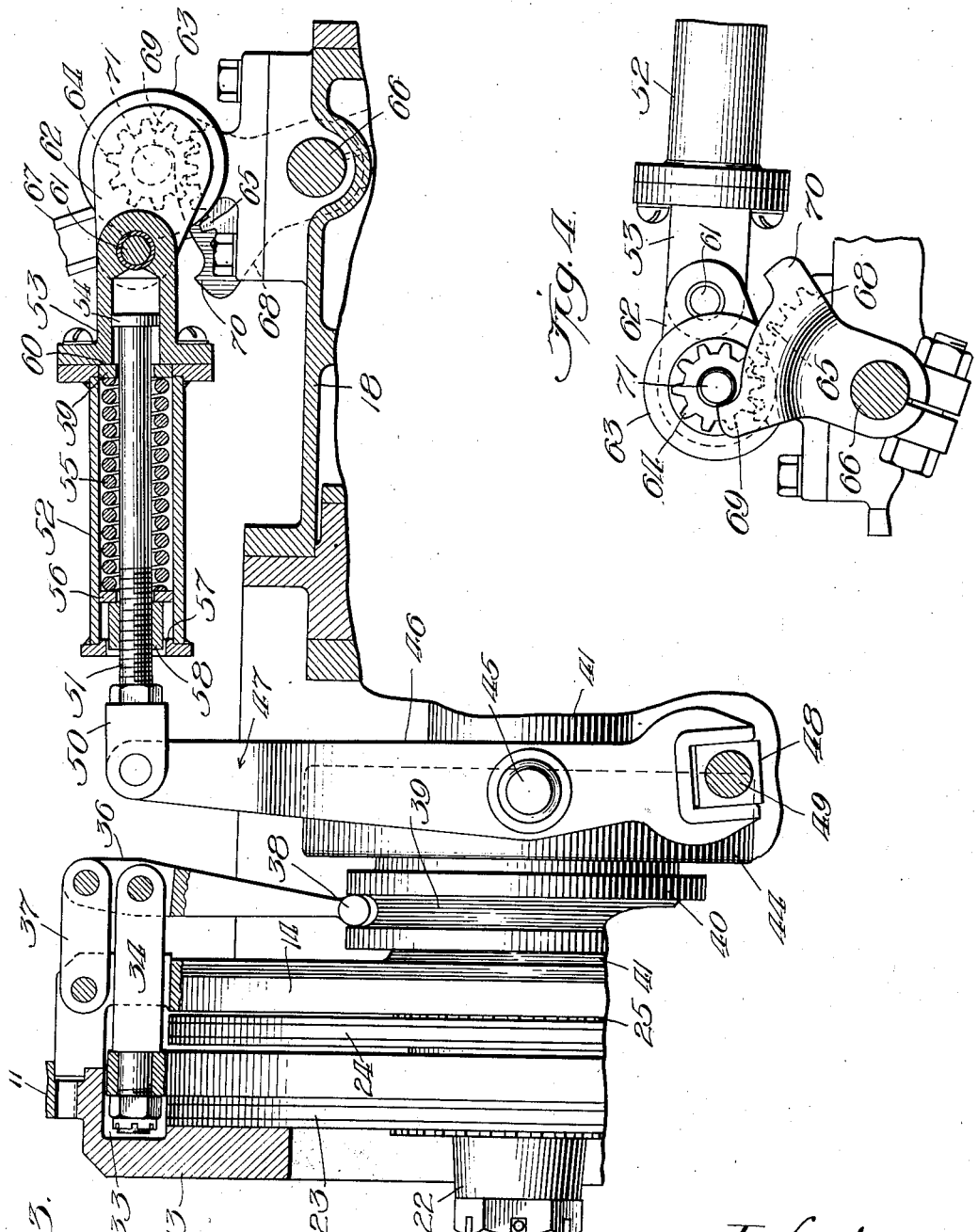

Patented Apr. 20, 1937

2,077,663

UNITED STATES PATENT OFFICE 2,077,663

REVERSING MECHANISM

Percy H. Batten, Racine, Wis., assignor to Twin Disc Clutch Company, Racine, Wis., a corporation of Wisconsin Application April 23, 1936, Serial No. 76,048

11 Claims. (Cl. 74—330)

My invention relates to a reversing mechanism having an improved spring loaded clutch device for effecting a transmission of power between driving and driven shafts.

One object of my invention is to devise a mechanism which incorporates direct and reverse driving gears whose selection is determined by the operation of direct and reverse drive clutches having a common clamping member, the clutches being spring-loaded and locked in their respective driving positions by the operation of shifting the clamping member into either operative position.

A further object is to provide a mechanism of the character indicated in which a single spring is employed to load and lock both clutches in their respective driving positions.

A further object is to devise a mechanism having clutches of the so-called dry plate type which are mounted in an enclosing casing constituting an element of each clutch and which is adapted for driven engagement with a suitable driving member, such as a flywheel and the like.

A further object is to devise a mechanism which employs a pair of single plate clutches, the friction plates of each clutch being separately connected for transmitting direct and reverse drives and clamped by a member common to both clutches which are positively driven by a main power source.

A further object is to provide a reverse and reduction mechanism in which the clutch devices and gear elements employed for drive and reduction are located in two groups constituting a clutch group and a gear group, the two groups being interconnected by concentric driving members.

These and further objects of my invention will be set forth in the following specification, reference being had to the accompanying drawings, and the novel means by which said objects are effectuated will be definitely pointed out in the claims.

In the drawings:

Fig. 2 is an end view, partly in section, taken along the line 2—2 in Fig. 1, looking in the direction of the arrows.

Fig. 3 is a fragmentary, enlarged, elevational view, partly in section, of the mechanism illustrated in Fig. 1 and showing the positions of the clutch devices and the operating mechanism therefor when the mechanism is conditioned for the transmission of direct drive.

Fig. 4 is an enlarged view of a portion of the operating mechanism, as viewed in the direction of the arrow 4 in Fig. 2, and showing the means for limiting the movement of the operating handle in either direction.

Figure 1:
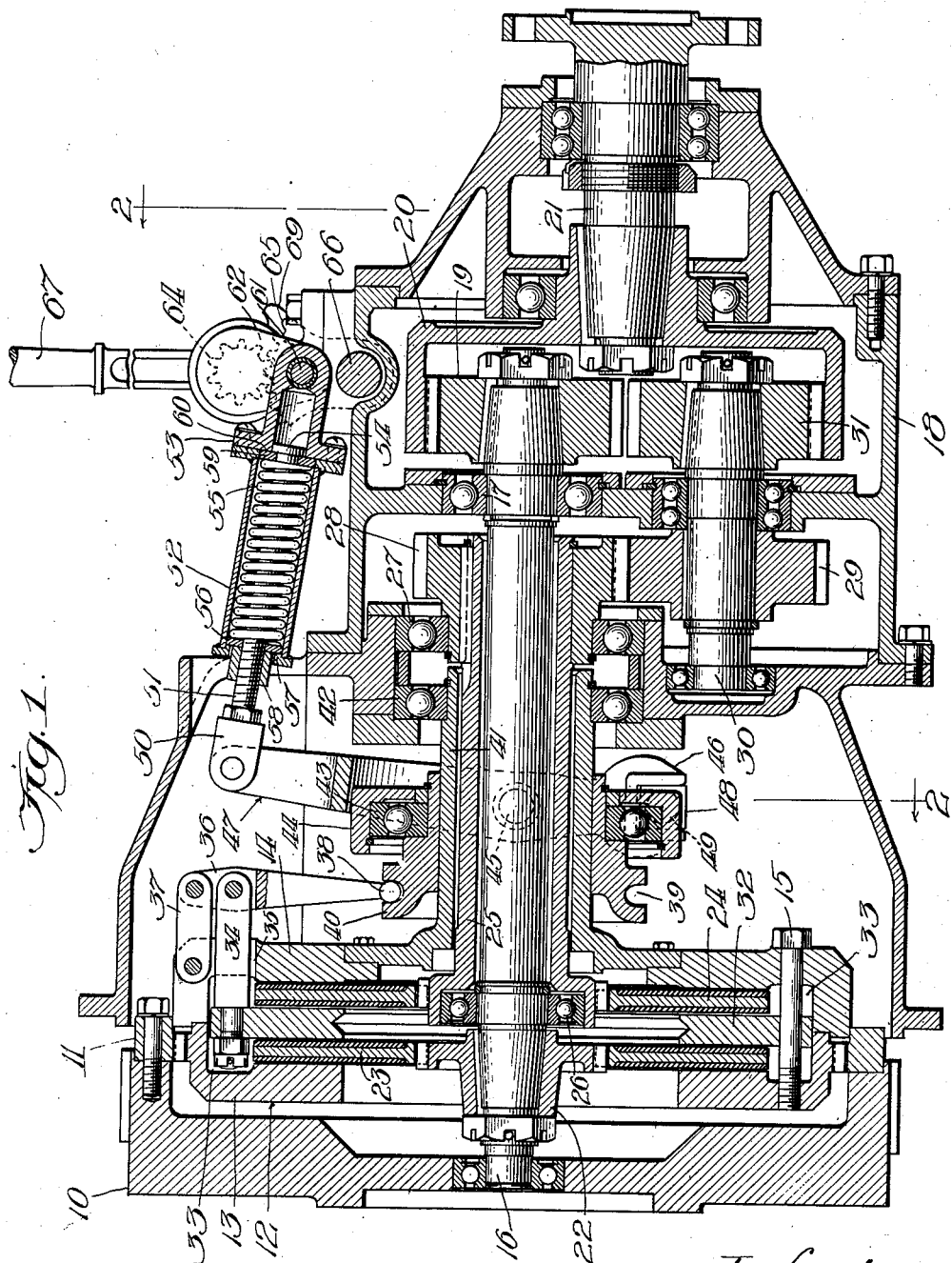
Figure 1 is a sectional elevation of my improved mechanism as viewed along the line 1—1 in Fig. 2, looking in the direction of the arrows.

Referring to Fig. 1, the numeral 10 designates a driving member, such as a flywheel and the like, which is suitably connected to a power source (not shown). Bolted or otherwise secured to one face of the flywheel is an internally toothed, driving ring 11 which engages with an externally toothed, clutch casing 12 that is preferably composed of two parts that are arranged as spaced, plate members 13 and 14. These members are secured together by bolts 15 and are therefore arranged for simultaneous rotation under the impulse transmitted by the driving ring 11. It will be understood, however, that, in some constructions, it may be possible to eliminate the driving ring 11 and, in such cases, the clutch casing 12 will be bolted or otherwise connected to the flywheel 10, or other driving member.

One end of a direct drive shaft 16 is journaled in the flywheel and, adjacent the opposite end, the shaft is journaled in a bearing 17 that is mounted in a housing 18 which encloses the mechanism hereinafter described. A pinion 19 is keyed or otherwise fixedly attached to the shaft 16 and is in constant mesh with an internal, driven shaft gear 20 that is secured to a driven shaft 21.

Adjacent the flywheel 10, a hub 22 is keyed to the shaft 16 and is externally provided with a plurality of teeth that are in constant mesh with similar teeth provided on the inner periphery of a friction disc 23 whose opposite faces may be provided with suitable friction facings. The friction disc 23 is located adjacent the inner face of the plate member 13 and a similar friction disc 24 is located adjacent the inner face of the plate member 14 and has toothed driving engagement with a reverse drive sleeve 25 that surrounds and is concentric with the shaft 16. The sleeve is supported entirely clear of contact with the shaft 16 by means of a bearing 26 at one end that encircles the shaft 16 and adjacent the opposite end by means of a bearing 27 that is mounted in the housing 18. Accordingly, the sleeve 25 is freely rotatable relative to and independently of the direct drive shaft 16 and it has affixed thereto a pinion 28 that is in constant mesh with a gear 29 secured to a countershaft 30 that is suitably journaled in the housing 18. A pinion 31 is also secured to the countershaft 30 and permanently meshes with the internal gear 20.

From the foregoing, it will be understood that the shaft 16 and sleeve 25 constitute elements for transmitting direct and reverse drives, respectively, to the gearing described and that the connection between the shaft and sleeve on the one hand and the flywheel 10 on the other is provided by a direct drive clutch defined by the plate 13 and the friction disc 23 and a reverse drive clutch defined by the plate member 14 and the friction disc 24. A common clamping member 32 is provided for these clutches and is located between the discs 23 and 24. The bolts 15 also extend through the clamping member to drivably connect the same to the clutch casing. In the present construction, these clutches are of the dry plate type, but the mechanism may also be designed to provide for an operation of these clutches in oil spray or a dipping in oil, as circumstances may require. The manner in which the foregoing clutches are selectively engaged will now be described.

As shown in Fig. 1, the clutches are occupying a neutral position and the distance between the opposed faces of the plate members 13 and 14 is such that, when the clamping member 32 is occupying the intermediate position shown, the friction discs 23 and 24 may freely accommodate themselves by an endwise movement so that they will occupy positions free of any contact with the faces of the clamping disc 32 and the plate members 13 and 14.

The periphery of the disc 32 extends into a counterbored recess 33 provided in the clutch casing and securely clamped to the disc 32 in this locality is one end of a rod 34 that projects outwardly through an aperture 35 provided in the plate member 14 for pivotal attachment to an intermediate portion of a lever 36. Outwardly of the rod 34, the end of the lever 36 is pivotally connected to one end of a link 37 whose opposite end is pivotally mounted on the clutch casing. The opposite or inward end of the lever 36 is provided with a rounded nose 38 that permanently seats in an annular groove 39 provided on a collar 40 which is slidably mounted on a sleeve 41. This sleeve surrounds and is concentric with the sleeve 25 and at one end is bolted securely to the plate member 14 and at the opposite end is journaled in a bearing 42 mounted in the casing 18. The sleeve 41 is free of any contact with the sleeve 25, thus avoiding any frictional losses in this portion of the mechanism.

The rod 34, lever 36 and link 37 constitute an operating mechanism for shifting the clamping disc 32 endwise and it will be understood that as many of these operating mechanisms may be employed as desired. In the present arrangement, three mechanisms are employed and they are equi-spaced circumferentially around the clutch casing and the inner or nose ends of each lever 36 is seated in the groove 39.

A ball bearing 43 is mounted on the collar 40 and a yoke 44 encircles the outer race of this bearing. This yoke is provided with a pair of laterally extending trunnions 45 (see Fig. 2) and each arm 46 of a shifting fork 47 pivotally engages a trunnion and at its lower end is bifurcated to embrace the opposite sides of a block 48 that is fixed to a pivot pin 49 rockably mounted in the housing 18.

The upper end of the shifting fork 47 is pivotally connected to a clevis 50 in which is fixedly mounted one end of a rod 51 that extends through a spring case 52 and is provided on its opposite end with an enlarged head 54. A helical spring 55 encircles the rod 51 within the case and at its left end, as viewed in Fig. 1, the spring bears against a washer 56 which is freely slidable along the rod 51 and which in turn abuts against a shoulder 57 formed on the case 52 and also against a nut 58 that is adjustable on the rod 51. The nut 58 constitutes a fixed abutment at the indicated end of the spring and provides a means for initially establishing any desired degree of compression in the spring. The opposite end of the spring bears against a washer 59 that is also freely slidable along the rod 51 and this washer in turn abuts against a shoulder 60 provided on the crosshead 53 and also against the head 54 which is slidable within a suitable opening provided in the crosshead.

The crosshead 53 is pivotally mounted on an eccentric pin 61 carried by a rock arm 62 that is fast to a rock shaft 63 journaled in the housing 18. The shaft 63 projects beyond this journal support and has affixed thereto a gear 64 which meshes with a sector gear 65 that is fastened to a rock shaft 66 that is also journaled on the housing 18. An operating handle 67 is also secured to the shaft 66 and its movement in opposite directions is limited by means of a sector flange 68 that is offset from the sector gear and whose opposite ends are formed as stops 69 and 70 (see Fig. 4). These stops engage with a reduced portion 71 of the shaft 63.

The operation of my improved reverse mechanism will now be described. Referring to Fig. 1, it will be assumed that the flywheel 10 is rotating at some determined speed, which speed is in turn transmitted to the clutch casing 12 by the driving ring 11, and that the clamping disc 32 occupies the neutral position shown. In this position of the indicated parts, it will be noted that while the clutch casing and the associated mechanism are rotating with the flywheel, the shifting fork 47 and the parts which operate the same permit this rotation by reason of the association of the yoke 44 with the outer race of the ball bearing 43. If now it is decided to transmit a direct or forward drive to the driven shaft 21, the operating handle 67 will be rocked in a counterclockwise direction, as viewed in Fig. 1, to thereby impart a movement of the eccentric pin 61 in a clockwise direction. This movement causes the shoulder 60 of the crosshead 53 to bear against the washer 59 and thus effects some compression of the spring 55 against the washer 56 which in turn bears against the fixed abutment nut 58. Accordingly, the rod 51 is moved toward the left, as viewed in Fig. 1, and, through the shifting fork 47, the collar 40 is shifted along the sleeve 41. The levers 36 are then rocked toward the clutch casing and the clamping disc 32 effects a clamping of the friction disc 23 between the opposed friction faces of the plate member 13 and the clamping disc 32.

At this point in the operation of the mechanism, the eccentric pin 61 will occupy a position slightly below that illustrated in Fig. 3 and further movement of the handle 67 will shift the eccentric pin to the point illustrated in Fig. 3 or one in which this pin occupies a position above, or outwardly with respect to the shaft 16, of a line passing through the centers of the shaft 63 and the pivotal connection of the shifting fork 47 and the clevis 50. This additional movement of the operating handle not only further compresses the spring 55, but the extending action of this spring also serves to lock the forward drive clutch in the forward drive position and additionally exerts a spring pressure against the plates composing this clutch. The arrangement also provides for automatic compensation for wear of the friction facings.

With the left hand or direct drive clutch in engagement, the drive from the flywheel 10 is transmitted through the driving ring 11, friction disc 23, hub 22, shaft 16, and pinion 19 to the driven shaft gear 20.

If now it is desired to reverse the drive, the operating handle 67 will be rocked in a clockwise direction to thereby shift the eccentric pin 61 to a position on the opposite side of the shaft 63, but in the same relative position thereto and to the pivotal connection between the shifting fork and the clevis 50. During this movement, the shoulder 57 on the spring case 52 shifts the washer 56 along the rod 51 and effects the desired compression of the spring 55 against the washer 59 which in turn abuts against the enlarged head 54, thus shifting the clamping plate 32 toward the right, as viewed in Fig. 1, and clamping the friction disc 24 between the opposed faces of the clamping plate and the plate member 14.

The last named clutch element constitute the reverse drive clutch of the mechanism and, in this position of the parts, the drive from the flywheel 10 will be transmitted through the friction disc 24 to the sleeve 25 and thence through the countershaft 30 to the driven shaft gear 20.

In the foregoing operation, the limit of movement of the operating handle 67 for forward drive is determined by the engagement of the stop 69 with the reduced shaft portion 71 and, during reverse drive, by the engagement of the stop 70 with the same shaft portion.

The foregoing mechanism may be embodied in an arrangement that is quite compact and in which a single loading spring is employed for both clutches, the spring being compressed by the operation of throwing the clutches into engagement and being thereafter held against its tendency to release. Moreover, because the respective clutches are engaged by the simple operation of loading the spring which in turn is always under the control of the operator, the clutches may be thrown into engagement free of any tendency to grab or jerk. The mechanism is further characterized by a simplicity in construction in that only a single clamping plate member is employed for both clutches. Moreover, this construction provides an arrangement for segregating the clutch and gear devices of the mechanism into separated groups, so that it is possible to utilize dry plate clutches, although the construction is not restricted in this respect. The arrangement is not restricted to the use of clutches having single friction plates, but is also capable of adaptation to multiple disc clutches.

I claim:

1. In a reversing mechanism, the combination of a pair of clutch devices, a pair of gears, concentric members connecting the devices and gears, respectively, a driven shaft gear meshing with one of the gears, an intermediate gear connecting the other gear with the driven shaft gear, and a member shiftable to engage either of the devices.

2. In a reversing mechanism, the combination of a pair of clutch devices, a first gear and a second gear, a shaft connecting the first gear with one device, a sleeve surrounding the shaft and connecting the second gear with the other device, a driven shaft gear meshing with the first gear, an intermediate gear connecting the second gear with the driven shaft gear, and a member shiftable to engage either of the devices.

3. In a reversing mechanism, the combination of a driving member, a pair of clutch devices connected to the member, a housing, a shaft connected to one device journaled in the member and housing, a gear fixed on the shaft, a driven shaft gear meshing with the shaft gear, a sleeve connected to the other device encircling the shaft, a gear fixed on the sleeve, an intermediate gear connecting the sleeve and driven shaft gears, and a member shiftable to engage either of the devices.

4. In a reversing mechanism, the combination of a pair of spaced plate members adapted for connection to a power source and joined for simultaneous rotation, a direct drive shaft, a reverse drive sleeve surrounding and concentric to the shaft, the shaft and sleeve being coaxial with the plate members, a first gear fixed on the shaft, a second gear fixed on the sleeve, a driven shaft gear meshing with the first gear, an intermediate gear connecting the second and driven shaft gears, a pair of friction discs disposed between the members and connected to the shaft and sleeve, respectively, and a clamping plate drivably connected to the members and disposed between the friction discs, the clamping plate being shiftable to frictionally engage either friction disc against the adjacent member.

5. In a reversing mechanism, the combination of a pair of spaced plate members adapted for connection to a power source and joined for simultaneous rotation, a driving shaft coaxial with the members, a first gear fixed on the shaft, a first sleeve surrounding and concentric with the shaft, a second gear fixed on the sleeve, a driven shaft gear meshing with the first gear, an intermediate gear connecting the second and driven shaft gears, a pair of friction discs disposed between the members and drivably connected to the shaft and sleeve, respectively, a clamping plate connected to both members and located between the friction discs, a second sleeve surrounding the first sleeve, and secured to one of the members, a collar slidable on the second sleeve, and connections between the collar and sleeve for shifting the latter to clamp either friction disc against the adjacent member dependent upon the direction of movement of the collar.

6. In a reversing mechanism, the combination of a pair of spaced plate members adapted for connection to a power source and joined for simultaneous rotation, a driving shaft coaxial with the members, a first gear fixed on the shaft, a first sleeve surrounding and concentric with the shaft, a second gear fixed on the sleeve, a driven shaft gear meshing with the first gear, an intermediate gear connecting the second and driven shaft gears, a pair of friction discs disposed between the members and drivably connected to the shaft and sleeve, respectively, a clamping plate connected to both members and located between the friction discs, a second sleeve surrounding the first sleeve and secured to one of the members, a collar slidable on the second sleeve and including an annular groove, and a plurality of operating mechanisms connecting the collar with the clamping plate to shift the same to clamp either friction disc against the adjacent member depending upon the direction of movement of the collar, each mechanism comprising a link pivoted on the members, a lever pivoted on the link and having a nose seated in the groove, and a rod secured to the clamping plate and extending through an aperture in one of the members for pivotal attachment to the lever.

7. In a reversing mechanism, the combination of a driving shaft, a driven shaft, a gear fixed on the driven shaft, means for operating the driven shaft in opposite directions comprising, respectively, a pair of gears fixed on and freely rotatable relative to the driving shaft, the fixed gear being in constant mesh with the driven shaft gear, a countershaft having a pair of gears fixed thereto, one meshing with the freely rotatable gear and the other with the driven shaft gear, a pair of clutches having a common connection with a power source and independently connectible to the driving shaft and freely rotatable gear, respectively, and a member shiftable to engage either clutch.

8. In a reversing mechanism, the combination of a driving shaft, a driven shaft, a gear fixed on the driven shaft, means for operating the driven shaft in opposite directions comprising, respectively, a pair of gears fixed on and freely rotatable relative to the driving shaft, the fixed gear being in constant mesh with the driven shaft gear, a countershaft having a pair of gears fixed thereto, one meshing with the freely rotatable gear and the other with the driven shaft gear, a pair of plate clutches having a common connection with a power source and independently connectible to the driving shaft and freely rotatable gear, respectively, and a clamping member common to both clutches and shiftable to engage either.

9. In a reversing mechanism, the combination of a driving shaft, a driven shaft, a gear fixed on the driven shaft, means for operating the driven shaft in opposite directions comprising a gear fixed on the driving shaft and in constant mesh with the driven shaft gear, a sleeve provided with a gear encircling and freely rotatable relative to the driving shaft, a countershaft having a pair of gears fixed thereto, one meshing with the sleeve gear and the other with the driven shaft gear, a pair of clutches having a common connection with a power source and independently connectible to the driving shaft and sleeve, respectively, and a member shiftable to engage either clutch.

10. In a reversing mechanism the combination of a driving shaft, a driven shaft, a gear fixed on the driven shaft, means for operating the driven shaft in opposite directions comprising, respectively, a pair of gears fixed on and freely rotatable relative to the driving shaft, the fixed gear being in constant mesh with the driven shaft gear, a countershaft having a pair of gears fixed thereto, one meshing with the freely rotatable gear and the other with the driven shaft gear, a pair of spaced plate members adapted for connection to a power source and joined for simultaneous rotation, the members being coaxial with the driving shaft, a pair of friction discs connected to the driving shaft and freely rotatable gear, respectively, and a clamping plate drivably connected to both members and disposed between the friction discs, the clamping plate being shiftable to engage either friction disc and the adjacent member.

11. In a reversing mechanism, the combination of a driving shaft, a driven shaft, a gear fixed to the driven shaft, means for operating the driven shaft in opposite direction comprising a gear fixed on the driving shaft and in constant mesh with the driven shaft gear, a sleeve provided with a gear encircling and freely rotatable relative to the driving shaft, a countershaft having a pair of gears fixed thereto, one meshing with the sleeve gear and the other with the driven shaft gear, a pair of spaced plate members adapted for connection to a power source and joined for simultaneous rotation, the members being coaxial with the driving shaft, a pair of friction discs connected to the driving shaft and sleeve, respectively, and a clamping plate drivably connected to both members and disposed between the friction discs, the clamping plate being shiftable to clamp either friction disc against the adjacent member.

PERCY H. BATTEN.